United States Patent Office 2,726,947
Patented Dec. 13, 1955

2,726,947

HERBICIDAL COMPOSITIONS COMPRISING ALKYL POLYCHLOROBENZOATES

Luther L. Baumgartner, Hastings, N. Y., assignor to The B. F. Goodrich Company, New York, N. Y., a corporation of New York No Drawing. Application December 22, 1950, Serial No. 202,441

12 Claims. (Cl. 71—2.6)

This invention relates to herbicides and to the total and selective killing of plant life therewith, and it pertains particularly to herbicidal compositions comprising, as an active ingredient, an ester of a polychlorobenzoic acid, and to the use thereof in weed control, particularly in certain crop plants.

It has heretofore been suggested that many monocarboxylic acids and their derivatives possess herbicidal activity. Benzoic acid and various halogenated derivatives of benzoic acid have been mentioned as herbicides but, as will be demonstrated hereinafter, it has been my experience that these acids are ineffective as total herbicides and that they possess little or no selective herbicidal activity. Consequently, it is entirely unlikely that they will find any practical use as herbicides.

I have discovered, however, that the esters of tri-, tetra- and penta-chlorobenzoic acids (referred to hereinafter as polychlorobenzoates) possess exceedingly useful herbicidal properties, being quite effective for use in pre- and post-emergent weeding of many crop plants and in addition, possessing useful and unique hormone activity on certain plants. They are useful when applied as herbicidal compositions made up using any suitable inert carrier, as by dispersing them in aqueous mediums, dispersing them in finely-divided pulverulent solids or by dissolving them in suitable solvents such as kerosene. Sprayable compositions containing from 0.05 to 5% by weight of these herbicidal esters, applied by means of nozzle-type spraying equipment, are exceptionally useful in that they possess selectivity and can therefore be used to control weed growth in plots of cultivated crop plants. Field tests have shown that a single application of such selective herbicidal compositions at the rate of two to ten pounds of active ingredient per acre will in most cases control weed growth for the entire season. The compositions containing from 5% to 10% by weight of these polychlorobenzoates, applied by means of a nozzle-type sprayer at the same or higher rates, will in general kill all plant life except woody tissue perennial growth and hence can be employed as total herbicides to control plant growth along railroad right of ways, highways, in driveways, tennis courts, drainage ditches, bridle paths, crushed stone pathways and the like. Hence these esters, unlike the free acids, are exceptionally useful both as total and selective herbicides.

The polychlorobenzoates, employed as herbicides in this invention, are prepared in any known manner as by the esterification of polychlorobenzoic acids or acid chlorides with an alcohol. The polychlorobenzoic acids and acid chlorides can themselves be prepared by the chlorination of benzoic acid according to various known methods resulting in the obtainment of tri-, tetra- and penta-chlorinated benzoic acids or their acid chlorides and various mixtures thereof.

The herbicides of this invention include all of the various esters of polychlorobenzoates of the general structure.

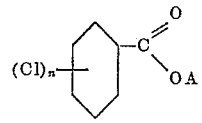

where $n$ represents a whole number from 3 to 5 and A is an organic group derived from the alcohol employed in preparing the ester. It is not at all essential that a single pure polychlorobenzoate be used since mixtures of the various possible individual compounds are equally as satisfactory as one single compound and, of course, are more economically obtained. Polychlorobenzoates which may be employed as herbicides include all of the various methyl, ethyl, butyl, propyl, amyl, hexyl, heptyl, octyl, nonyl, decyl, dodecyl and lauryl esters (that is, alkyl esters prepared from alkanols) as well as oleyl, allyl and isoprene esters (from unsaturated alcohols) and ethylene glycol and polyethylene glycol esters (from polyhydroxy alcohols). These polychlorobenzoates include the isomeric 2,3,4-, 2,3,5-, 2,3,6-, 3,4,5-, 2,4,6-, and 2,5,6-trichlorobenzoates, the isomeric 2,3,4,5-, 2,3,4,6-, 2,4,5,6- and 3,4,5,6- tetrachlorobenzoates, and pentachlorobenzoates. The preferred polychlorobenzoates are those having the above formula where A is an alkyl group containing from 1 to 12 carbon atoms.

Inexpensive sprayable aqueous herbicidal compositions can be readily and conveniently prepared by reducing the polychlorobenzoate, which is ordinarily a solid, to a finely-divided powder form and adding the desired amount of the powdery material with vigorous stirring to an aqueous solution of a surface active agent (i. e., a wetting or dispersing agent). In this manner a uniform aqueous dispersion of the active ingredient is obtained. Also a solution of the polychlorobenzoate in an organic solvent can be prepared and added to water to form an aqueous spray. If the solvent is water miscible such as are alcohol acetone and pyridine, the solution containing the desired amount of the polychlorobenzoate can be simply mixed with water to give the aqueous spray, but if the solvent is a hydrocarbon, such as kerosene, which is immiscible in water, then the solution is added to an aqueous solution of a surface-active agent thereby forming a sprayable oil-in-water emulsion.

Solutions of the polychlorobenzoates in organic solvents are also convenient for use as sprayable herbicidal compositions. The most inexpensive of these are solutions of the active herbicidal ingredient in light hydrocarbon solvents such as kerosene, light fuel oils and diesel fuel oils.

The sprayable compositions, whether aqueous dispersions or emulsions or solutions in organic solvents, can be adapted for use with either of the two general types of spray equipment currently in use—the nozzle type of sprayer and the mist sprayers. The first type employs a relatively large volume of low concentration liquid spray forced through a nozzle or spray head by air pressure and gives a heavy coverage of the low concentration of active ingredient. The second type is the mist sprayer, employs a spray containing a high concentration of active ingredient and atomizes the liquid spray composition thereby giving substantially the same coverage of active ingredient by weight with a small amount of liquid. This type of sprayer makes use of the air as a part of the carrier vehicle. Liquid sprayable compositions for use in such mist sprayers may contain as high as 25 or even 50% by weight of the active herbicidal ester.

The polychlorobenzoates can also be incorporated with an inert finely-divided pulverulent solid carrier and applied as a dust. Generally it will be found that the herbicidal activity of such dusts will be enhanced if a surface active agent (wetting or dispersing agent) is also incorporated in the dust composition. Dusts not containing a wetting or dispersing agent are prepared by milling or grinding together the inert solid carrier and the active ingredient. However, when a wetting or dispersing agent is employed, it is generally preferable that a convenient quantity of the finely-divided inert carrier be first thoroughly and uniformly wetted and mixed with an aqueous solution containing the desired amount of such wetting or dispersing agent, after which the water is removed as by drying and the residue admixed with the remainder of the finely-divided inert solid carrier and with the polychlorobenzoate active agent, as by grinding or milling in the usual manner. Suitable inert solid materials which can be used as carriers for preparing dusting compositions include clays, diatomaceous earths, inorganic silicates, talc and calcium carbonate, among others.

Suitable surface active agents, including dispersing and wetting agents, which can be used to prepare the above-described compositions can be typified by the following general classifications; sodium and potassium salts of fatty acids known as soft and hard soaps; salts of disproportionated abietic acid known as rosin soaps; salts of the hydroxyaldehyde acids present in seaweed known as algin soaps; alkali-casein compositions; water-soluble lignin sulfonate salts, long-chain alcohols usually containing 10 to 18 carbon atoms; water-soluble salts of sulfated fatty alcohols containing 10 to 18 carbon atoms; water-soluble salts of sulfated fatty acid amides; water-soluble esters of sulfated fatty acids; water-soluble alkyl sulfonate having on the average of 16 carbon atoms in the alkyl group; water-soluble aryl sulfonate; water-soluble alkyl aryl sulfonate; water-soluble aralkyl sulfonate; water-soluble sorbitan mono-laurate, -palmitate, -stearate, and -oleate; quaternary ammonium alkyl halides; fatty acids saponified with amines and amino alcohols; blood albumin; and others. These materials are sold under numerous trade names either as pure compounds or mixtures of compounds of the same class or mixtures of these compounds with fillers or diluents.

The quantity of any of the above surface active agents to be used will depend upon the dispersing or wetting efficiency of each individual compound or mixture but in general 0.01% to 1.0% by weight of the surface active agent based on the total weight of the composition, will be satisfactory for most all uses.

The following examples illustrate herbicidal compositions of this invention and their application to, and effect upon, a wide variety of plants. Examples 1 to 5 set forth the results of tests conducted in a greenhouse to determine in a preliminary way the biological effect of polychlorobenzoates on plant life. Examples 5 and 6 however are field tests demonstrating many practical applications of the polychlorobenzoates as herbicides. The examples also show that the useful herbicidal activity of the polychlorobenzoates of this invention is not possessed by the corresponding chlorobenzoic acids. The trichlorobenzoates used in the examples were prepared by chlorinating benzoic acid until three ring hydrogens were replaced by chlorine and then reacting the resulting mixed isomeric trichlorobenzoyl chlorides with the appropriate alcohol.

EXAMPLE 1

A solution containing 0.5% by weight of isopropyl trichlorobenzoate dissolved in insecticide grade kerosene was placed on immature cabbage, tomato and bean plants. Two days after this treatment the cabbage plants showed no apparent injury. The bean plants exhibited some injury and the terminal portions of the tomato plants were severely injured. The tomato plants did not die but they showed both epinastic and morphogenic response (i. e. there was substantial leaf modification and the new shoots were tightly curled). Several flower buds were eventually produced by the tomato plants but they did not develop into mature flowers. The plants were allowed to grow but even 100 days after treatment the tomato plants had only grown 2 inches in height.

EXAMPLE 2

One gram of isopropyl trichlorobenzoate was mixed with two grams of lanolin. This paste was applied to the stems of two bean plants 7 inches high and to two tomato plants 10 inches high at the rate of application of about 0.25 gram of active ingredient per plant. This treatment produced extreme effects on both species. The tomato plants showed pronounced injury as manifested by epinasty, growth inhibition, leaf malformation and lack of petiole development. Also extremely good translocation of the trichlorobenzoate was made manifest by the malformation of leaves at a considerable distance from the point of application. The response of the bean plants was quite similar, there being injury, growth inhibition and inhibition of trifoliated leaf development and, in addition, the production of extremely large auxiliary clusters of flowers followed by the untimely death of the plant. The majority of the flowers produced by these treated bean plants were sterile and the few pods which did develop were empty.

EXAMPLE 3

Kerosene (insecticide grade) solutions of isopropyl trichlorobenzoate at various concentrations were sprayed, by means of a small-size nozzle sprayer, on greenhouse flats containing actively growing fescue, bean and tomato plants. Compositions containing the active ingredient in concentrations of 0.25% and below produced slight injury to the plants while compositions containing concentrations of the active ingredient from 0.5% to 1% killed both the tomato and bean plants but only slightly injured the grass. Concentrations above 1.5% by weight killed all three species of plants.

EXAMPLE 4

In greenhouse flats containing sterilized soil there was planted a mixture of fescue and tomato seeds. Then these flats were given a pre-emergent treatment by spraying as in Example 3, with several compositions containing respectively methyl-, isopropyl- and sec. butyl trichlorobenzoate each in concentrations of from 0.05% to 1% by weight. These compositions employed both kerosene and aqueous solutions of a wetting agent as the carrier. The grass plants which germinated emerged with slightly curled leaves, and only 50% of the tomato seeds germinated, whereas there was excellent germination of both grass and tomato in a control.

EXAMPLE 5

In October flowering crabgrass plants growing in greenhouse soil flats were dipped in various solutions, each containing a different chemical compound. The solvent employed contained 90% kerosene and 10% acetone. These treated plants were covered with paper bags. When the crabgrass seeds on these treated plants had matured, the seeds were collected, subjected to conditions which cause the necessary dormancy and then these seeds were planted at the end of January in flats containing serilized soil. The flats were placed in a greenhouse together with controls in which had been planted crabgrass seeds obtained from flowering plants which had been covered with paper bags but received no chemical treatment. In each flat there was planted three hundred seeds. At the end of March, two months after planting, the flats were examined to determine the number of seeds germinated and the growing crabgrass plants were examined. The chemical compounds employed in these tests, the concentration of these compounds used for treatment as well as the observed results of these tests are tabulated below:

*Treatment of crabgrass seed*

| Chemical Compound Employed | Concentration, percent by weight | Number of Seeds Germinated | Condition of Plants |
|---|---|---|---|
| None (Control) | | 133 | 6" high and flowering. |
| Isopropyl trichloro-benzoate | 1.0 | 7 | 1½" high—just emerging. |
| | 0.5 | 14 | 3½" high. |
| Methyl trichloro-benzoate | 1.0 | 0 | No growth. |
| | 0.5 | 14 | 2" high—all severely malformed. |
| n-Butyl trichlorobenzoate | 1.0 | 5 | 2" high. |
| | 0.5 | 23 | 2½" high — very poor root system. |

The malformation caused by methyl trichlorobenzoate appeared as severe epinasty of the plant and negative geotropism of the roots.

The above example illustrates how esters of polyhalobenzoic acid can be employed to control and eradicate crabgrass by the application of these esters to flowering crabgrass plants. Such a treatment not only prevents germination of over 92% of the seeds but stunts and otherwise alters the growth of the plants which do grow as to produce plants which either die or cannot reproduce.

The above five examples which are in the nature of laboratory tests indicated that polychlorobenzoate possessed useful herbicidal activity. The following example is a field test where compositions containing various polychlorobenzoates were employed to kill weed plants between and among rows of crop plants.

EXAMPLE 6—FIELD TEST

A number of commercial crop plants, 56 in all, representing 11 different plant families were planted in parallel 180 ft. rows the 25th of July, each species being planted in a single row. Four days later, before weed plants and crop plants had emerged, kerosene solutions containing respectively methyl, isopropyl and sec. butyl trichlorobenzoates and trichlorobenzoic acid were each applied perpendicularly across 20 ft. portions of each of the 56 rows for the entire length of the plot. The rate of application of each solution was three pounds of the active ingredient per acre. These applications were made to test the preemergent effect of these chemical compounds. In this way four 20 foot portions of each row in the field test plot were treated with each of four different weed control compositions. Then on the 2nd day of August (8 days after planting), when the crop plants had emerged or were emerging, the same four solutions were each applied to different 20 foot strips of the plot which had not been previously treated. These applications were made to test the post-emergent effect of the four chemical compounds. The end 20 feet of each row was left untreated to be used as a control. The rate of application of each solution in these post-emergent tests was also three pounds of active ingredient per acre. The weed growth between and among the rows of crop plants was made up primarily of red root, lamb's quarters, ragweed, crabgrass, purslane, chickweed and hen's-foot. It was observed that both the pre-emergent and the post-emergent spray applications of each of the three esters (methyl, isopropyl and butyl esters) of trichlorobenzoic acid gave very good control of the weed growth up to and including the 15th day of November at which time a killing frost and freeze had killed the weed growth in the control strip. The free trichlorobenzoic acid gave no control of the weed growth at all.

The three trichlorobenzoates employed each had the same effect on the same crop plant species. The tables which follow show the effect of these esters on each species for both pre-emergent and post-emergent application and hence is a guide to the use of the polychlorobenzoate esters as herbicides. These results are typical for the class of polychlorobenzoates hereinbefore defined.

*Effect of alkyl polychlorobenzoates on crop plants*

TABLE 1.—ON GRAMINEAC (GRASS)
EFFECT ON PLANTS AT DIFFERENT TIMES OF APPLICATION

| Crop Plant | Pre-emergence | Post-emergence |
|---|---|---|
| Sweet Sudan Grass | Stunted | None. |
| Commercial Sudan Grass | None | Do. |
| Sugar Drip Sorghum | Killed | Do. |
| Cottontail Millet | None | Do. |
| Broom Corn | do | Do. |
| Amber Cane | do | Do. |
| Teosinte | Killed | Stunted. |
| Hungarian Millet | do | Do. |
| Rex Sorghum | Stunted | None. |
| Field Corn K-24 | Killed | Do. |
| Inbred Field Corn A-3B | None | Do. |
| Sweet Corn | Killed | Do. |
| Shallu | Stunted | Do. |

TABLE 2.—ON LEGUININOSAE (LEGUMES)
EFFECT ON PLANTS AT DIFFERENT TIMES OF APPLICATION

| Crop Plant | Pre-emergence | Post-emergence |
|---|---|---|
| Seshania | Killed | Killed. |
| Cratalaria | do | Do. |
| Black Wilson Soybeans | do | Do. |
| Hawkeye Soybeans | do | Do. |
| Lincoln Soybeans | do | Do. |
| Navy Beans | do | Do. |
| Peanuts | None | Do. |
| Winter Hairy Vetch | Killed | Stunted. |
| Whippoorwill Cowpeas | None | Killed. |
| Bush Lima Beans | Killed | Do. |
| Loredo Soybeans | do | Do. |
| Ogden Soybeans | None | Do. |
| Munsoi | Stunted | Stunted. |

TABLE 3.—ON CRUCIFERAE (CRUCIFERS)
EFFECT ON PLANTS AT DIFFERENT TIMES OF APPLICATION

| Crop Plant | Pre-emergence | Post-emergence |
|---|---|---|
| Dwarf Blue Curled Scotch Kale | None | None. |
| Purple Top White Globe Turnip | do | Do. |
| Dwarf Essex Rape | do | Do. |
| Rutabaga | do | Do. |
| Cabbage | do | Do. |
| Radish | do | Do. |
| Kahlrabi | do | Do. |

TABLE 4.—ON MISCELLANEOUS PLANT FAMILIES
EFFECT ON PLANTS AT DIFFERENT TIMES OF APPLICATION

| Crop Plant | Pre-emergence | Post-emergence |
|---|---|---|
| (Chenopodiocea) | | |
| Selesian Sugar Beets | Killed | Killed. |
| Swiss Chard | do | None. |
| (Umhelliferaceae) | | |
| Carrot | None | Do. |
| (Curcurhitaceae) | | |
| Cucumber | do | Killed. |
| Pumpkin | Killed | None. |
| (Malvaceae) | | |
| Ingold CoHon | do | Killed. |
| (Solonaceae—Night Shade) | | |
| Potatoes | None | Do. |
| (Compositae) | | |
| Mammoth Russian Sunflower | do | Do. |
| Leaf Lettuce | Killed | None. |
| (Pedaliaceae) | | |
| Bene | do | Killed. |
| (Polygonacea) | | |
| Buckwheat | do | Do. |

The results shown in the above tables clearly illustrate the selectivity of the herbicidal activity of the polychlorobenzoates. For example, it will be noted that the polychlorobenzoates can be used safely for weed killing among and near most Gramineac (grasses) after these grass plants have emerged, although such specific grasses as Teosinte and Hungarian Millet are somewhat affected both before and after emerging. The legumes in general have little or no tolerance for polychlorobenzoates when used in post-emergence applications, but it will be noted that a few species, namely peanuts, whipporwill, cowpeas and Ogden soybeans can be weeded with these esters when employed in post-emergence applications. On the other hand the crucifers can in general be safely weeded with the polychlorobenzoates at any time for they possess a great tolerance for these esters even as tender emerging plants.

Among the other plant families the effect of polychlorobenzoates on the plants (or the tolerance of the plants for these esters) varies not only from family to family but among members of the same family. An interesting example of this variation in the same family is found in the Curcurhitaceae, where the polychlorobenzoates in pre-emergence applications kill cucumber but not pumpkin but in post-emergence application kill pumpkin but not cucumber. Also of interest is the fact that sugar beets are killed by both pre- and post-emergence applications but carrots, another root crop plant, are not killed by either application.

among cultivated commercial crop plants will be relatively low because the alkyl polychlorobenzoates may need under most conditions to be applied only once during the growing season, either as a pre-emergent application or a post-emergent application depending on the tolerance of the crop plants to the active ingredient. Under extreme conditions a second application, where the plant tolerance permits, will be all that is necessary for good weed control.

EXAMPLE 7

As hereinbefore stated, halobenzoic acids have been proposed as active ingredients in weed killing compositions. In the following Table 5, results obtained by the use of suggested halobenzoic acids are presented together with those obtained by the use of the polychlorobenzoate esters of this invention. All compounds were applied as a pre-emergence application to unsterilized soil seeded with weeds, the rate of application being indicated in the table. The principal weeds were lambs quarters, dock and crabgrass.

TABLE 5.—PRE-EMERGENCE HERBICIDAL ACTIVITY OF CHLOROBENZOIC ACIDS AND ESTERS

| Treatment Number | Active Ingredient | Rate of Application | Carrier | Percent of Area Covered by weeds 2½ weeks after treatment | Observation | |
|---|---|---|---|---|---|---|
| | | | | | 2½ weeks after treatment | 5 weeks after treatment |
| 1 | n-Butyl trichlorobenzoate. | 8 lbs. per Acre | Kerosene | 2 | No burdock. Slight growth of lambs quarters and crabgrass. ¼ inch high. | Few burdock ½ inch high. No significant growth of lambs quarters and crabgrass. |
| 2 | ___do___ | ___do___ | 0.25% Aqueous Soln., Sharples 218.[1] | 6 | ___do___ | Few burdock ¼ inch high. No significant growth of lambs quarters and crabgrass. |
| 3 | 2,4,5-Trichlorobenzoic acid. | ___do___ | 10% Acetone, 90% Kerosene. | 75 | Considerable growth of lambs quarters and burtock ½ inch high. | Lambs quarters and burdock grown to 2 to 3 inches high. Also considerable crabgrass emerging. |
| 4 | ___do___ | ___do___ | 0.25% Aqueous Soln., Sharples 218.[1] | 95 | Considerable growth of lambs quarters, burdock and crabgrass ¼ to ½ inch high. | Good growth of all three to height of 2½ to 7½ inches. |
| 5 | Isopropyl trichlorobenzoate. | ___do___ | Kerosene | 30 | All three weeds present ½ to ¾ inch high. | Slight growth to height of 1 to 2½ inches. |
| 6 | ___do___ | ___do___ | 0.25% Aqueous Soln., Sharples 218.[1] | 35 | All three weeds present ¼ to ¾ inch high. | Very slight growth of lambs quarters and burdock. Moderate growth of crabgrass. |
| 7 | o-Chlorobenzoic acid. | 4 lbs. per Acre | 10% Acetone, 90% Kerosene. | 90 | All three weeds present but mainly lambs quarters. All about 1 inch high. | Considerable increase of crabgrass and burdock. All plants 3 to 7 inches high. |
| 8 | 2,4,5-trichlorobenozic acid. | ___do___ | ___do___ | 95 | All three weeds present but mostly lambs quarters and burdock. Plants ½ to 1 inch high. | Considerable increase of crabgrass plants. All plants 3 to 5 inches high. |
| 9 | Methyl trichlorobenzoate. | ___do___ | ___do___ | 15 | Predominantely burdock with a few lambs quarters and crabgrass plants ¼ to ⅜ inch high. | No lambs quarters—no increase in number of other two weeds. Surviving plants had little or no growth. |
| 10 | Control | No treatment | | 100 | Substantially equal distribution of all three weed plants. All plants about 1 inch high. | Considerable increase in number of crabgrass plants. All others normal. Height of plants from 2 to 8 inches. |

[1] Sharples 218, a polyethylene glycol tert. dodecyl thioether.

While satisfactory weed killing was obtained in the above Example 6 by the use of kerosene solutions of the alkyl polychlorobenzoates, the use of such spray compositions is not recommended where it is known that the crop plant will absorb the kerosene and retain it in the edible portion of the plant thereby making the crop plant unacceptable to the market. In such cases aqueous dispersions or dust compositions containing alkyl polychlorobenzoates can be used with equal success to control the weed growth. In fact, spray compositions which employ aqueous mediums as a carrier are not only as useful and produce results substantially equivalent to those shown in Example 6, but, in general, are preferred because they are the least expensive to prepare. Concentrated solutions in kerosene as well as concentrated aqueous dispersions when used with mist-type sprayers also have a low cost per treated acre. In any case the cost of controlling weed growth in and It will be noted from the data in the table above that the use of the esters of trichlorobenzoic acid as weed killers in the pre-emergence tests produced results greatly superior to those obtained by the use of the chlorobenzoic acids for the same purpose. Although the test soil was uniformly seeded with equal amounts of each of the weeds, the methyl and n-butyl tri-chlorobenzoates not only prevented germination of most of the seeds (about 85 to 98% failed to germinate) but they also greatly inhibited the growth of those plants which did germinate. In this test the isopropyl ester does not appear to possess as much herbicidal activity as do the methyl and n-butyl esters, but the isopropyl ester is vastly superior to the chlorobenzoic acids for it did prevent the emergence of 60 to 65% of the weeds and inhibited the growth of the emerged plants. Examples 5 and 6 clearly indicate that the isopropyl ester is an excellent selective herbicide.

A property of the esters of polychlorobenzoic acids not illustrated in Table 5 but which was observed, is that they induce hormonal response. This appears to be a property only of the esters, for none of the chlorobenzoic acids tested induced hormonal response. This hormonal response was made manifest as a gall formation in the crown area of burdock as well as malformation of the aerial parts, severe epinasty of the blades of crabgrass as well as negative geotropism of the crabgrass roots, and severe sortening of internodal growth of all plants which grew after pre-emergence treatment with the polychlorobenzoates.

Although the invention has been illustrated by means of specific examples it is not desired or intended that it be limited solely thereto for as hitherto stated the precise proportions of the active ingredients can be varied, equivalent members of the class of polychlorobenzoates herein defined can be substituted and other materials may be employed if desired without departing from the spirit and scope of this invention as defined in the appended claims.

I claim:

1. A herbicidal composition comprising as the essential active ingredient from 0.5% to 10% by weight of an unsubstituted alkyl trichlorobenzoate, and an inert carrier therefor.

2. A herbicidal composition comprising as the essential active ingredient from 0.5% to 10% by weight of methyl trichlorobenzoate, and an inert carrier therefor.

3. A herbicidal composition comprising as the essential active ingredient from 0.5% to 10% by weight of isopropyl trichlorobenzoate, and an inert carrier therefor.

4. A herbicidal composition comprising as the essential active ingredient from 0.5% to 10% by weight of sec. butyl trichlorobenzoate and an inert carrier therefor.

5. A herbicidal composition comprising as the essential active ingredient from 0.5% to 10% by weight of n-butyl trichlorobenzoate and an inert carrier therefor.

6. The method of controlling weeds which comprises applying to the area in which weed growth is to be controlled, at least two pounds per acre of an ester of a polychlorobenzoic acid of the formula

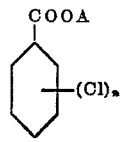

in which $n$ represents an integer from 3 to 5, inclusive, and A represents an aliphatic alcohol radical.

7. The method of selectively killing weed plants in plots of cultivated crop plants which comprises applying to said plots an alkyl trichlorobenzoate at a rate of least two pounds per acre.

8. The method of selectively killing weed plants in plots of cultivated crop plants which comprises applying to said plots methyl trichlorobenzoate at the rate of two to five pounds per acre.

9. The method of selectively killing weed plants in plots of cultivated crop plants which comprises applying to said plots isopropyl trichlorobenzoate at the rate of two to five pounds per acre.

10. The method of selectively killing weed plants in plots of cultivated crop plants which comprises applying to said plots sec. butyl trichlorobenzoate at the rate of two to five pounds per acre.

11. The method of selectively killing weed plants in plots of cultivated crop plants which comprises applying to said plots n-butyl trichlorobenzoate at the rate of two to five pounds per acre.

12. A herbicidal composition comprising as the essential active ingredient from 0.5% to 50% by weight of ester of trichlorobenzoic acid and an unsubstituted aliphatic alcohol and an inert carrier therefor.

References Cited in the file of this patent

UNITED STATES PATENTS 2,394,916    Jones _____ Feb. 12, 1946

OTHER REFERENCES

J. Amer. Chem. Soc., vol. 69 (1947), pages 2679–2682.

Chemical Abstracts, vol. 42 (1942), col. 1244$^e$, abstract of article by Norlander et al.

Contrib. Boyce Thompson Institute, Jan.–Mar. 1952, page 423.